United States Patent
Halter et al.

(10) Patent No.: US 11,263,053 B2
(45) Date of Patent: Mar. 1, 2022

(54) TAG ASSISTED CLOUD RESOURCE IDENTIFICATION FOR ONBOARDING AND APPLICATION BLUEPRINT CONSTRUCTION

(71) Applicant: VMware, Inc., Palo Alto, CA (US)

(72) Inventors: Bryan P. Halter, Merrimack, NH (US); Alexey Intelegator, Burlington, MA (US); Chinmay Gore, Burlington, MA (US); Maximilian Choly, Burlington, MA (US)

(73) Assignee: VMware, Inc., Palo Alto, CA (US)

( * ) Notice: Subject to any disclaimer, the term of this patent is extended or adjusted under 35 U.S.C. 154(b) by 34 days.

(21) Appl. No.: 16/520,939

(22) Filed: Jul. 24, 2019

(65) Prior Publication Data
US 2021/0026702 A1 Jan. 28, 2021

(51) Int. Cl.
*G06F 9/50* (2006.01)
*G06F 9/455* (2018.01)
*G06F 8/60* (2018.01)

(52) U.S. Cl.
CPC .............. *G06F 9/5044* (2013.01); *G06F 8/60* (2013.01); *G06F 9/45533* (2013.01); *G06F 9/505* (2013.01); *G06F 9/5072* (2013.01); *G06F 9/5077* (2013.01); *G06F 2009/45562* (2013.01); *G06F 2009/45591* (2013.01)

(58) Field of Classification Search
CPC .... G06F 9/5072; G06F 9/45533; G06F 9/505; G06F 9/5077; G06F 8/60; G06F 2009/45562; G06F 2009/45591
See application file for complete search history.

(56) References Cited

U.S. PATENT DOCUMENTS

| | | | |
|---|---|---|---|
| 8,327,350 B2 * | 12/2012 | Chess | G06F 9/5077 717/177 |
| 9,697,037 B2 * | 7/2017 | DeLuca | G06F 9/45558 |
| 9,990,232 B2 * | 6/2018 | Chen | G06F 9/45558 |
| 2014/0289730 A1 * | 9/2014 | Fitzgerald | G06F 9/455 718/1 |
| 2017/0351535 A1 | 12/2017 | Mao et al. | |

(Continued)

OTHER PUBLICATIONS

VMware, Inc. "vCenter Server and Host Management," Update 1, VMware ESXi 5.1, vCenter Server 5.1, 2017, 230 pages.

*Primary Examiner* — Jacob D Dascomb
(74) *Attorney, Agent, or Firm* — Kim & Stewart LLP

(57) ABSTRACT

Tags are applied to gather information about an application that has been deployed across a plurality of resources, so that application resources can be brought under management and a blueprint for the deployed application can be constructed using information gathered from the tags. A method of identifying resources of a deployed application for management comprises applying tags to currently deployed resources of the application including virtual machines (VMs), storing tag data in association with the VMs to which the tag has been applied in an inventory data store, searching the inventory data store for VMs to which first tags have been applied, wherein the first tags each have tag value that identifies the deployed application, searching the inventory data store for second tags that have been applied to the VMs, and adding the resources identified by the first and second tags to a group of application resources to be managed.

18 Claims, 6 Drawing Sheets

(56) References Cited

U.S. PATENT DOCUMENTS

| | | |
|---|---|---|
| 2018/0165122 A1 | 6/2018 | Dobrev |
| 2018/0343300 A1 | 11/2018 | Halter et al. |
| 2019/0012211 A1* | 1/2019 | Selvaraj ................ G06F 9/5055 |
| 2020/0097309 A1* | 3/2020 | Chopra ................ G06F 9/4843 |
| 2020/0301583 A1* | 9/2020 | Gavali ................ G06F 3/0655 |

* cited by examiner

| Tag Category | Value | Use |
|---|---|---|
| AppID | string value | to associate the tagged resource with an application identified by the string value |
| AppTier | Web, App, DB | to associate the tagged resource with the tier of a multi-tiered database application that includes a web tier, application tier, and a database tier |
| Net | string value | to associate the tagged resource with a network resource identified by the string value |
| LB | string value | to associate the tagged resource with a load balancer identified by the string value |
| CPU | number value | to indicate that the tagged resource has been allocated a number of CPU cores equal to the number value |
| Memory | number value | to indicate that the tagged resource has been allocated a memory size equal to the number value in GB |
| Access | L1, L2, L3 | to indicate the permission level that is required to access the tagged resource |
| OS | string value | to indicate that the operating system of the tagged resource is the one identified by the string value |
| Security | G1, G2, G3 | to indicate the security group the tagged resource belongs to |
| NType | string value | to indicate the network resource type of the tagged resource |
| BW | high, med, low | to indicate the bandwidth requirements of the tagged resource |
| IO | fast, normal, slow | to indicate the IO latency requirements of the tagged resource |
| Backup | number value | to indicate that the backup frequency of the tagged resource is equal to the number value, in months |

FIGURE 3

TAG ASSISTED CLOUD RESOURCE IDENTIFICATION FOR ONBOARDING AND APPLICATION BLUEPRINT CONSTRUCTION

BACKGROUND

Existing cloud management software allows customers to automate the deployment of applications into public and private cloud environments. Tags have been employed by the customers to build reports about the status of virtual resources that have been provisioned for the deployed applications. For example, customers who have deployed applications into virtualized computing environments provisioned using vSphere®, which is a suite of software components for virtualization available from VMware, Inc. of Palo Alto, Calif., tags can be created, edited, removed, and applied to virtual and physical resources of the virtualized computing environments as a way to manage permissions, monitor tasks and events, and set alerts. Further details on tagging resources in virtualized computing environments provisioned using vSphere® are described in the document "vCenter Server and Host Management," which is available from VMware, Inc. and is incorporated by reference herein. It should be recognized that the tagging functionality is also available in all major cloud computing platforms including AWS™ and Azure®.

SUMMARY

In one or more embodiments, tags are applied to gather information about an application that has been deployed across a plurality of virtual compute, networking, and storage resources, so that application resources can be brought under management (i.e., onboarded) and a blueprint for the deployed application can be constructed using information gathered from the tags. Thus, in situations where an application blueprint never existed, is not available (e.g., the application blueprint is owned by a third party or the application blueprint is in someone's head and was never reduced to writing), or incomplete, application resources can be brought under management by a platform different from the one that deployed the application, and the application blueprint can be reconstructed in accordance with one or more embodiments.

A method of identifying resources of a deployed application for management, according to an embodiment, comprises applying tags to currently deployed resources of the application including virtual machines (VMs), storing tag data in association with the VMs to which the tag has been applied in an inventory data store, searching the inventory data store for VMs to which first tags have been applied, wherein the first tags each have tag value that identifies the deployed application, searching the inventory data store for second tags that have been applied to the VMs, and adding the resources identified by the first and second tags to a group of application resources to be managed.

Further embodiments of the present invention include a non-transitory computer readable storage medium that includes instructions that enable a processing unit to implement one or more aspects of the above method, as well as a virtualized computing system configured to implement one or more aspects of the above method.

BRIEF DESCRIPTION OF THE DRAWINGS

FIG. 3 is a table that shows for, each of the tags shown in FIG. 2, category, expected value, a description of how it is used.

DETAILED DESCRIPTION

Figure 1:
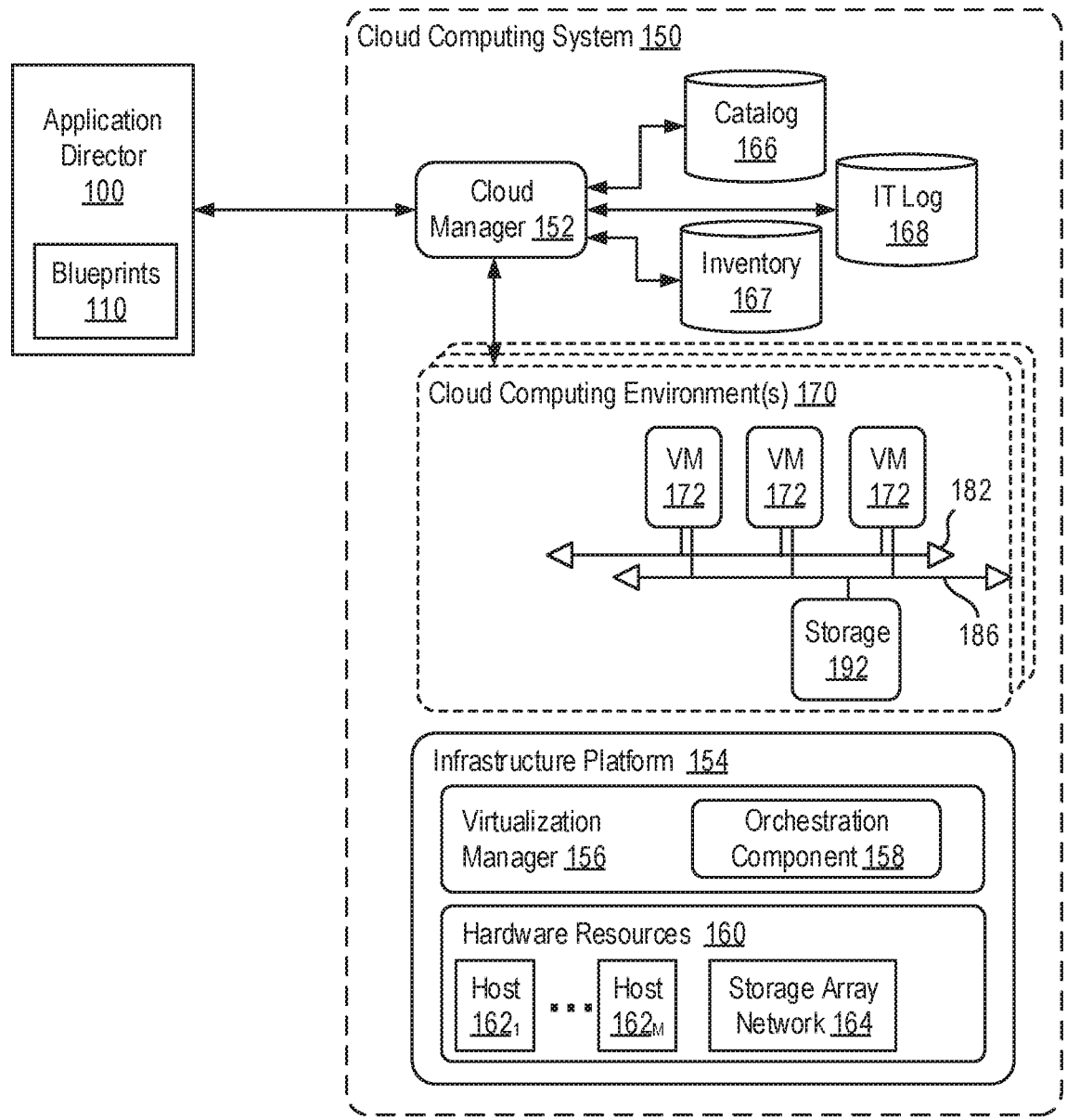
FIG. 1 is a block diagram of a cloud computing system to which an application is deployed.

FIG. 1 is a block diagram of a cloud computing system 150, which may be a public or private cloud service, to which an application, e.g., multi-tier application, is deployed. The deployment of the application may be automated according to its blueprint. FIG. 1 depicts an application director 100, which is software running in a physical or virtual server, for carrying out the deployment of various applications according to blueprints 110 in cloud computing system 150.

Cloud computing system 150 is configured to dynamically provide an enterprise (or users of an enterprise) with one or more software-defined data centers (referred to herein as cloud computing environments 170), in which a user may provision VMs 172, deploy applications onto VMs 172, and/or execute workloads. Cloud computing system 150 includes an infrastructure platform 154 upon which cloud computing environments 170 may be executed. In the particular embodiment of FIG. 1, infrastructure platform 154 includes hardware resources 160 having compute resources (e.g., hosts $162_1$ to $162_N$), storage resources (e.g., one or more storage array systems, such as SAN 164), and networking resources, which are configured in a manner to provide a virtualization environment that supports the execution of a plurality of virtual machines 172 across hosts 162. It should be recognized that hardware resources 160 of cloud computing system 150 may in fact be distributed across multiple data centers in different locations.

In one embodiment, virtualization manager 156 which is software running in a physical or virtual server, includes an orchestration component 158 that provides infrastructure resources to cloud computing environment 170 responsive to provisioning requests. For example, if an enterprise required a specified number of virtual machines to deploy a web applications or to modify (e.g., scale) a currently running web application to support peak demands, orchestration component 158 can initiate and manage the instantiation of virtual machines (e.g., VMs 172) on hosts 162 to support such requests. In one embodiment, orchestration component 158 instantiates virtual machines according to a requested template that defines one or more virtual machines. Further, orchestration component 158 monitors the infrastructure resource consumption levels and requirements of cloud computing environment 170 and provides additional infrastructure resources to cloud computing environment 170 as needed or desired. In one example, VMs 172 are instantiated in hosts 162 that implement as their virtualization software layer ESX® hypervisors provided by VMware, Inc. of Palo Alto, Calif. (although it should be recognized that any other virtualization technologies, including Xen® and Microsoft Hyper-V virtualization technologies may be utilized consistent with the teachings herein). Orchestration component 158 also provisions one or more virtual networks 182 used to communicate between VMs 172, and one or more virtual storage networks 186 through which VMs 172 send IOs (input/output operations) to virtual storage 192.

Cloud computing system 150 may include a cloud manager 152, which is software running in physical or virtual server, that manages allocation of virtual computing resources to an enterprise that is deploying applications into cloud computing environment 170. Cloud manager 152 may be accessible to users via a REST (Representational State Transfer) API (Application Programming Interface) or any other client-server communication protocol. Cloud manager 152 may authenticate connection attempts from the enterprise using credentials issued by the cloud computing provider. Cloud manager 152 maintains and publishes a catalog 166 of available virtual machine templates and virtual machine packages that represent virtual machines that may be provisioned in cloud computing environment 170. A virtual machine template is a virtual machine image that is loaded with a pre-installed guest operating system, applications, and data, and is typically used to repeatedly create a VM having the pre-defined configuration. A virtual machine package is a logical container of one or more pre-configured virtual machines that package applications and parameters that define operational details of the package. An example of a VM package is vApp™ technology made available by VMware, Inc., of Palo Alto, Calif., although other technologies may be utilized. Cloud manager 152 receives provisioning requests submitted (e.g., via REST API calls) and may propagates such requests to orchestration component 158 to instantiate the requested virtual machines (e.g., VMs 172).

Cloud manager 152 also maintains an inventory 167 of physical and virtual resources (also referred to as "objects") that are provisioned in cloud computing environments 170 to support applications that are deployed in accordance with blueprints 110. In the embodiments illustrated herein, the provisioned resources include virtual compute resources, virtual networking resources, and virtual storage resources, and inventory 167 stores information about tags that have been applied to these resources (such information also referred to herein as "tag data").

When service work is performed on any of the objects in inventory 167 to fix issues and resolve user requests, an IT log 168, maintained by cloud manager 152, is updated to include a description of the service work, identifying one or more objects that were involved in performing the service work.

Figure 2:
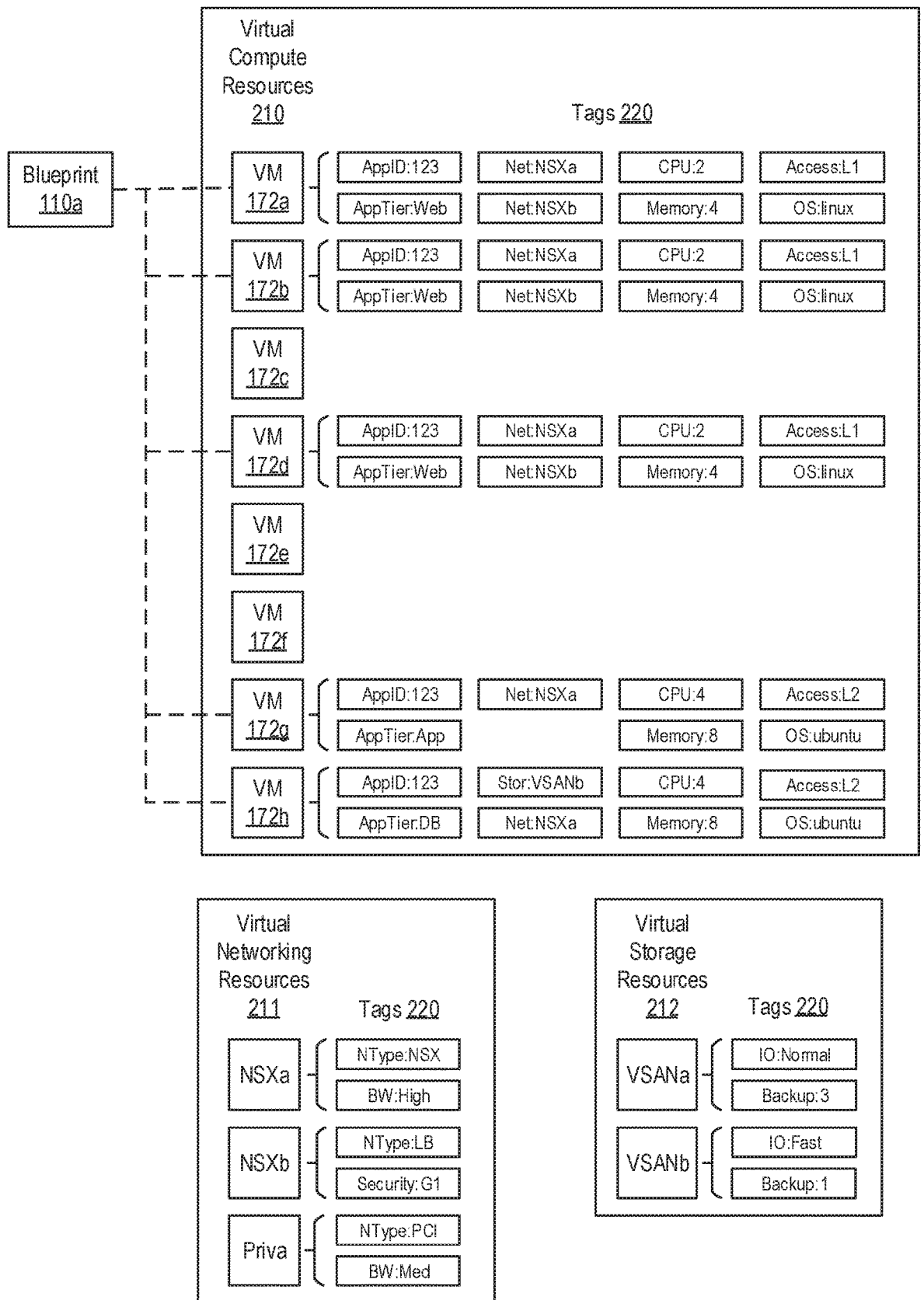
FIG. 2 is a conceptual diagram that illustrates different virtual resources and various tags that have been applied to these resources.

FIG. 2 is a conceptual diagram that illustrates different virtual resources, namely virtual compute resources 210, virtual networking resources 211, and virtual storage resources 212, and various tags 220 that have been applied to these resources. Each tag 220 belongs to a category and has a value and they are expressed using the following nomenclature in FIG. 2: category:value. In practice, there are many more tag categories and each virtual resource may be tagged with many more tags than illustrated in FIG. 2, but for simplicity in explaining the concepts of the embodiments illustrated herein, only a small subset of such tag categories and only a small subset of tags are illustrated in FIG. 2. In addition, in the description below a tag of a category, XYZ, is referred to as an XYZ tag.

Each of tags 220 has an entry in the table shown in FIG. 3. For each tag entry, the table shows a category, expected value, and a description of how it is used. For example, the string value for the NType tag may be: Pub (to indicate a public network), Priv (to indicate a private network), PCI (to indicate a PCI network), NSX (to indicate a virtualized network), and LB (to indicate a network load balancer that manages external connections and weeds out dead instances). Access tags are applied with a value of predetermined access permission levels, L1, L2, and L3, where in L1 is a higher access level than L2, L2 is a higher access level than L3. Security tags are applied with a value of predetermined security groups, G1, G2, and G3. Security groups identify a pool of VMs amongst which load balancing is carried out.

As explained above, tags have been employed for purposes of building reports about the status of virtual resources that have been provisioned for a deployed application. In the embodiments, tags are applied for a different purpose, which is to gather information about an application that is deployed across a plurality of virtual compute, networking, and storage resources, that is typically contained in application blueprints. Thus, in situations where an application blueprint never existed, is not available (e.g., the application blueprint is owned by a third party or the application blueprint is in someone's head and was never reduced to writing), or incomplete, application blueprints can be reconstructed by applying and evaluating tags according to embodiments as described below.

By reconstructing application blueprints, a number of benefits can be achieved. First, all of the virtual compute, networking, and storage resources of a deployed application can be brought under management of an enterprise that owns the application or an enterprise that desires to provide cloud management services to the application owner. This means that the enterprise can now observe the cost of the VMs, power-on and power-off VMs accordingly, set security policies and role-based access controls on the VMs, and assign them to specific projects so people within that project can share them.

Second, additional instances of the same application may be deployed. As a result, services such as high availability and disaster recovery may be provided, and migration to a less expensive cloud computing service provider will be possible. In addition, a test instance of the same application may be deployed to a test data center so that troubleshooting can be carried out on issues with the application. Similarly, further development and patching may be carried out on the application by deploying an instance of the application to a development test center.

Figure 4:
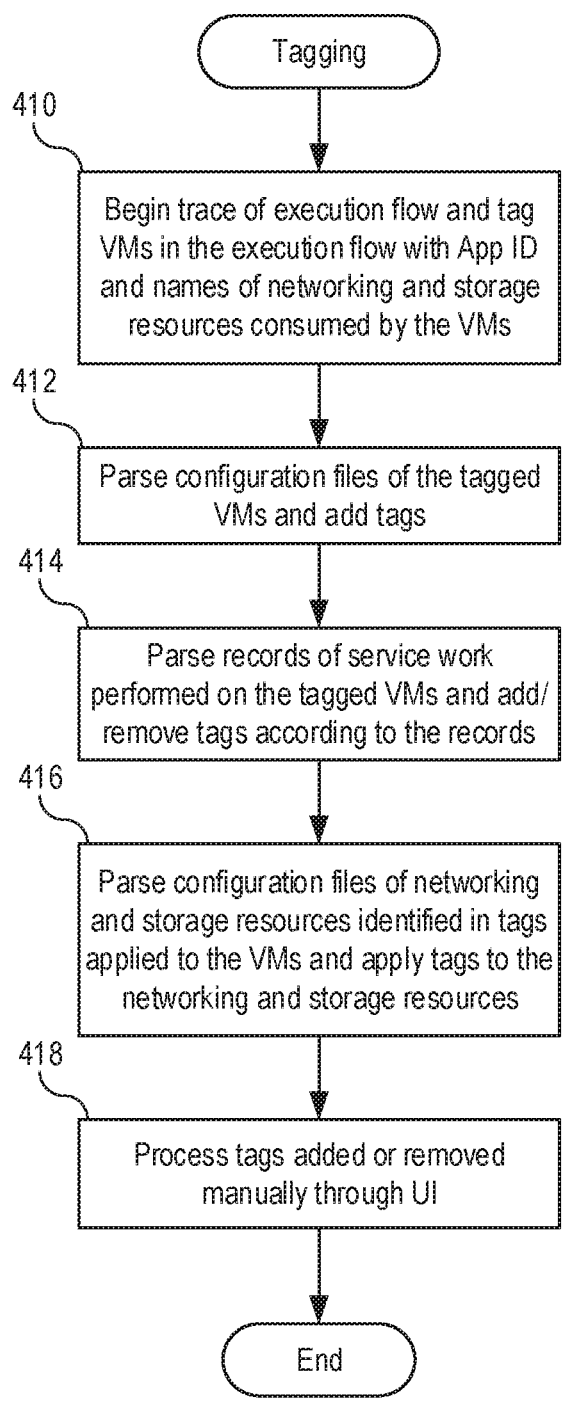
FIG. 4 is a flow diagram of a method of applying tags to resources of the cloud computing system.

FIG. 4 is a flow diagram of a method of applying tags to resources of cloud computing environment 170. In the embodiments described herein, the method is carried out by cloud manager 152 based on data collected in inventory data store (e.g., inventory 167) and service log (e.g., IT log 168), and data input by an administrator through a user interface provided by cloud manager 152. Alternatively, the method may be carried out by virtualization manager 156 based on the inventory and the service log that it maintains and the data input through a user interface that it provides.

The data collected in the inventory data store includes the tags that are applied to the virtual resources of cloud computer environment 170. The tagging of virtual resources that have been provisioned to support a deployed application is enabled by modifying the hypervisors that support VMs 172 in cloud computing environment 170 to include an agent that traces the execution flow of the deployed application (hereinafter referred to as the "tracing agent") and determines which of VMs 172 are in the execution flow of the deployed application.

The method of applying tags depicted in FIG. 4 begins at step 410 where cloud manager 152 instructs the tracing agent to begin tracing of the execution flow and report back VMs 172 that are in the execution flow of the deployed application and also any virtual networking or storage resources that are consumed by such VMs. Upon receiving the report from the agent, cloud manger 152 updates its inventory data store to add AppID tags to the VMs determined by the agent to be in the execution flow of the deployed application, where the AppID tags added to the VMs (also described herein as "applied to the VMs"; such VMs described herein as the "tagged VMs") each have a value equal to the application ID of the deployed application, and if any virtual network or storage resources are consumed by the tagged VMs, to add Net tags (having a value equal to the ID of the virtual network resource that is consumed) and Stor tags (having a value equal to the ID of the virtual storage resource that is consumed).

At step 412, cloud manager 152 parses configuration files of the tagged VMs and updates its inventory data store to add tags relating to performance requirements of VMs, such as CPU tag, memory tag, etc. In one embodiment, the configuration files are obtained from virtualization manager 156 that provisioned the VMs. Alternatively, cloud manager 152 may maintain in a data store, configuration files for all virtual resources, and retrieve the configuration files of the tagged VMs from the data store.

At step 414, cloud manager 152 accesses IT log 168, conducts a search for records of service work performed on the tagged VMs, and parses the search results to add tags to or remove tags from the inventory data store according to the records. For example, an access tag may be added to a VM if the service record indicates that user access to the VM is not allowed because the user does not have the requisite access level (also referred to as "access permission level").

At step 416, cloud manager 152 parses configuration files of the virtual network or storage resources consumed by the tagged VMs and updates its inventory data store to add tags relating to performance requirements of network and storage resources, such as bandwidth, IO latency, backup frequency, etc. In one embodiment, the configuration files are obtained from virtualization manager 156 that provisioned the resources. Alternatively, cloud manager 152 may maintain in a data store, configuration files for all virtual resources, and retrieve the configuration files of the virtual network or storage resources consumed by the tagged VMs from the data store.

Step 418 allows for user intervention via inputs made through a user interface (UI) to designate what tags should be added and what tags should be deleted. Upon receiving the user inputs through the UI, cloud manager 152 updates the inventory data store to add or remove tags in accordance with the user inputs.

Figure 5:
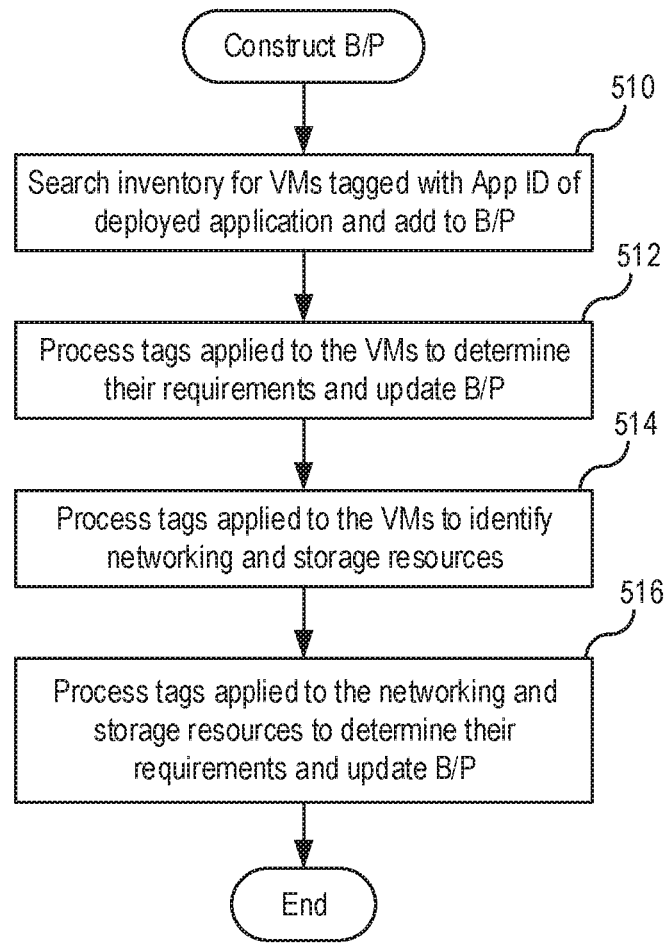
FIG. 5 is a flow diagram of a method of processing the tags to generate a blueprint according to one or more embodiments.

FIG. 5 is a flow diagram of a method of processing the tags to generate a blueprint according to one or more embodiments. In the embodiments described herein, the method is carried out by cloud manager 152 based on the tags applied to resources in accordance with FIG. 3, such information being stored in the inventory data store. Alternatively, the method may be carried out by virtualization manager 156 based on the tag data stored in its inventory data store.

The method of FIG. 5 begins at step 510, where cloud manager 152 searches the inventory data store for VMs that are tagged with AppID tags having tag value equal to the application ID of the deployed application, and adds VMs to an application blueprint.

At step 512, cloud manager 152 determines performance requirements of the VMs found in step 510 from tags relating to performance requirements of VMs, such as CPU tag, memory tag, etc., that are applied to the VMs, and updates the application blueprint with this information.

At step 514, cloud manager 152 looks for Net tags and Stor tags applied to the VMs found in step 510 to identify networking and storage resources consumed by the VMs. Then, at step 516, cloud manager 152 determines performance requirements of the networking and storage resources identified in step 514 from tags relating to performance requirements of network and storage resources, such as bandwidth, IO latency, backup frequency, etc., and updates the application blueprint with this information.

The blueprint reconstruction process ends after step 514 and the reconstructed blueprint is ready to be used to bring under management of the enterprise that owns the application, all of the virtual compute, networking, and storage resources that have been provisioned to support the application. In addition, additional instances of the same application may be deployed using the reconstructed blueprint so as to enable services such as high availability and disaster recovery, and migration to a less expensive cloud computing service provider. Furthermore, as explained above, a test instance of the same application may be deployed to a test data center so that troubleshooting can be carried out on issues with the application, and further development and patching may be carried out on the application by deploying an instance of the application to a development test center.

Figure 6:
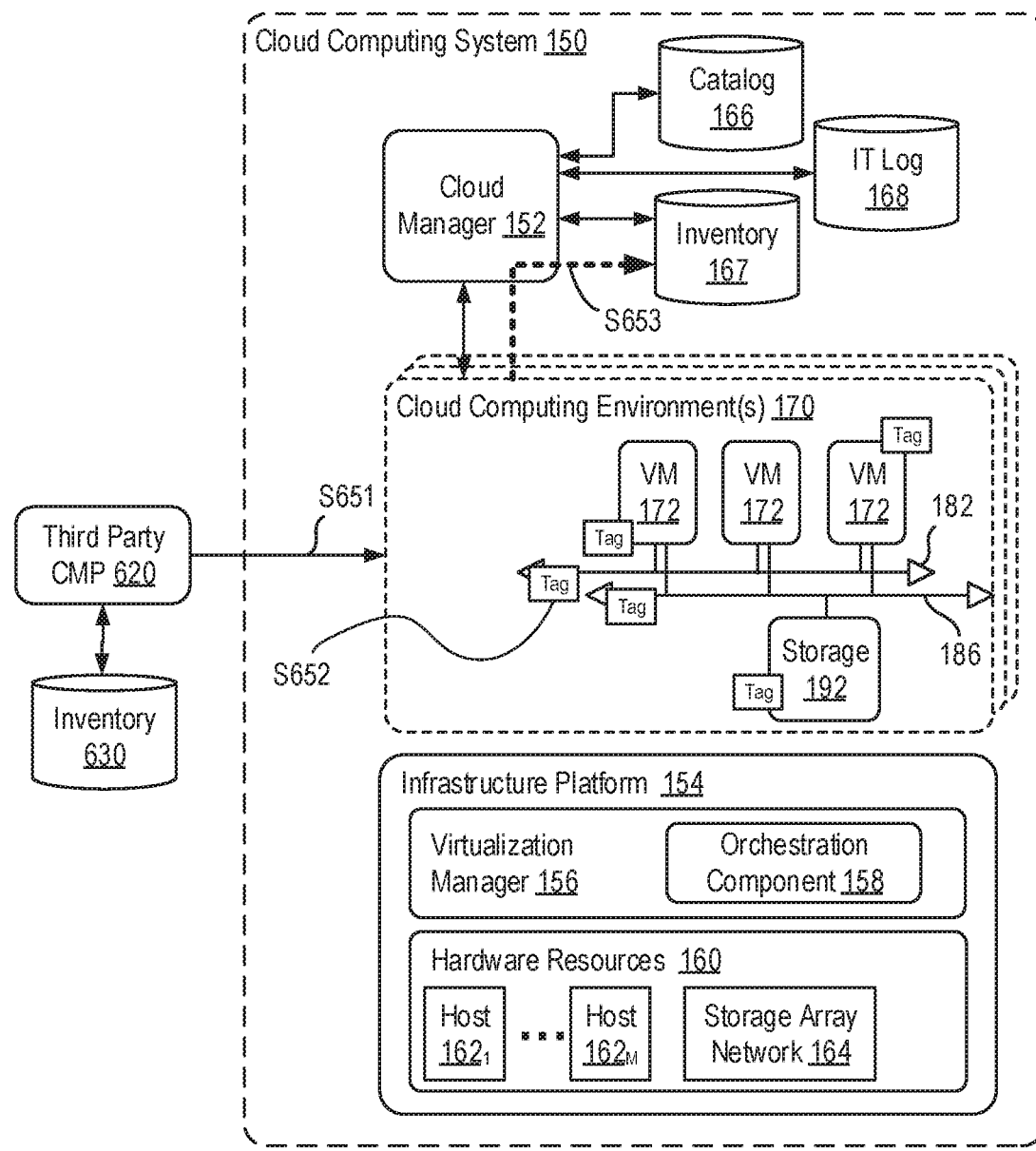
FIG. 6 is a conceptual diagram that illustrates onboarding of virtual resources of an application to a cloud management platform that did not initially deploy the application.

FIG. 6 is a conceptual diagram that illustrates onboarding of virtual resources of an application to a cloud management platform that did not initially deploy the application. In FIG. 6, it is assumed that a third party cloud management platform (CMP) 620 was used to deploy an application to cloud computing environment 170 which is provisioned through cloud manager 152. The deployment is depicted in FIG. 6 as step S651. In order to bring virtual resources of the application under management of cloud manager 152, tagging (represented as step S652) is performed in the manner illustrated in the flow diagram of FIG. 4, and inventory 167 of cloud manager 152 is updated to add tag data to the virtual resources of the application (step S653). As a result, the virtual resources that make up an application can now be managed together as a group through cloud manager 152. Thus, in situations where an application blueprint never existed, is not available (e.g., the application blueprint is owned by a third party or the application blueprint is in someone's head and was never reduced to writing), or incomplete, the virtual resources that make up an application can now be onboarded and managed together as a group.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments, may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method of identifying resources of a deployed application for management, said method comprising:
    applying tags to currently deployed resources of the application including virtual machines, wherein each of the tags is of a particular tag category and has a tag value;
    for each of the tags, storing the tag category thereof and the tag value thereof in association with the virtual machine to which the tag has been applied in an inventory data store;
    searching the inventory data store for first virtual machines of the virtual machines to which first tags have been applied, wherein the first tags are tags of a first tag category and the tag value of the first tags is equal to an application ID of the application;
    searching the inventory data store for second tags that have been applied to the first virtual machines to identify first resources of the resources consumed by the first virtual machines, wherein the second tags are tags of a tag category different from the first tag category;
    determining first performance requirements of the first virtual machines from third tags applied to the first virtual machines;
    determining second performance requirements of the first resources from fourth tags applied to the first resources;
    adding each resource identified by the first and second tags to a group of application resources to be managed, which includes the first virtual machines and the first resources; and
    generating a blueprint for the application that includes the group of application resources to be managed and the first and second performance requirements.

2. The method of claim 1, wherein the deployed resources further include storage and network resources, which are identified by the tag values of the second tags.

3. The method of claim 2, wherein the first tags are applied to the virtual machines when the virtual machines are accessed during execution of the application.

4. The method of claim 3, wherein the second tags are applied when the storage and networking resources are accessed by the virtual machines during execution of the application.

5. The method of claim 4, wherein the fourth tags define minimum performance requirements of the storage and networking resources as part of the second performance requirements, and the fourth tags are applied based on a performance history of the storage and networking resources.

6. The method of claim 3, wherein the second tags are applied based on history of troubleshooting operations conducted on the virtual machines.

7. The method of claim 3, wherein the third tags define minimum performance requirements of the virtual machines as part of the first performance requirements.

8. The method of claim 3, wherein the tags further include fifth tags that define access permission levels of the virtual machines.

9. A non-transitory computer readable medium comprising instructions executable by a processor, wherein the processor executing the instructions carries out a method of identifying resources of a deployed application for management, said method comprising:

applying tags to currently deployed resources of the application including virtual machines, wherein each of the tags is of a particular tag category and has a tag value;

for each of the tags, storing the tag category thereof and the tag value thereof in association with the virtual machine to which the tag has been applied in an inventory data store;

searching the inventory data store for first virtual machines of the virtual machines to which first tags have been applied, wherein the first tags are tags of a first tag category and the tag value of the first tags is equal to an application ID of the application;

searching the inventory data store for second tags that have been applied to the first virtual machines to identify first resources of the resources consumed by the first virtual machines, wherein the second tags are tags of a tag category different from the first tag category;

determining first performance requirements of the first virtual machines from third tags applied to the first virtual machines;

determining second performance requirements of the first resources from fourth tags applied to the first resources;

adding each resource identified by the first and second tags to a group of application resources to be managed, which includes the first virtual machines and the first resources; and generating a blueprint for the application that includes the group of application resources to be managed and the first and second performance requirements.

10. The non-transitory computer readable medium of claim 9, wherein the deployed resources further include storage and network resources, which are identified by the tag values of the second tags.

11. The non-transitory computer readable medium of claim 10, wherein the first tags are applied to the virtual machines when the virtual machines are accessed during execution of the application.

12. The non-transitory computer readable medium of claim 11, wherein the second tags are applied when the storage and networking resources are accessed by the virtual machines during execution of the application.

13. The non-transitory computer readable medium of claim 12, wherein the fourth tags define minimum performance requirements of the storage and networking resources as part of the second performance requirements, and the fourth tags are applied based on a performance history of the storage and networking resources.

14. The non-transitory computer readable medium of claim 11, wherein the second tags are applied based on history of troubleshooting operations conducted on the virtual machines.

15. The non-transitory computer readable medium of claim 11, wherein the third tags define minimum performance requirements of the virtual machines as part of the first performance requirements.

16. The non-transitory computer readable medium of claim 11, wherein the tags further include fifth tags that define access permission levels of the virtual machines.

17. A computer system, comprising:

a plurality of physical and virtual resources including first virtual machines and second virtual machines; and a management server for the virtual machines, wherein the management server is programmed to carry out a method of constructing a blueprint of an application that has been deployed across the first virtual machines, said method comprising:

applying first and second tags to the first virtual machines, wherein each of the tags is of a particular tag category and has a tag value;

for each of the tags, storing the tag category thereof and the tag value thereof in association with the first virtual machine to which the tag has been applied in an inventory data store;

searching the inventory data store for the first virtual machines to which the first tags have been applied, wherein the first tags are of a first tag category and the tag value of the first tags is equal to an application ID of the application;

searching the inventory data store for the second tags that have been applied to the first virtual machines to identify first resources of the resources consumed by the first virtual machines, wherein the second tags are tags of a tag category different from the first tag category;

determining first performance requirements of the first virtual machines from third tags applied to the first virtual machines;

determining second performance requirements of the first resources from fourth tags applied to the first resources;

adding each resource identified by the first and second tags to a group of application resources to be managed, which includes the first virtual machines and the first resources; and generating the blueprint for the application that includes the group of application resources to be managed and the first and second performance requirements.

18. The computer system of claim 17, wherein the application is deployed across storage and network resources, and the tag values of the second tags identify one or more of the storage and network resources.

* * * * *